United States Patent [19]

Rampf et al.

[11] Patent Number: 4,480,006

[45] Date of Patent: Oct. 30, 1984

[54] DISTANCE SHEETING FOR THE CONSTRUCTION OF MOLDS AND MODELS

[75] Inventors: Rudolf Rampf, Riederich; Erich Sollner, Lehningen, both of Fed. Rep. of Germany

[73] Assignee: Ciba-Geigy GmbH, Baden, Fed. Rep. of Germany

[21] Appl. No.: 427,425

[22] Filed: Sep. 29, 1982

[51] Int. Cl.³ ............................................. C09U 7/02
[52] U.S. Cl. .................................... 428/343; 249/112; 249/114 R; 249/115; 264/213; 264/313; 428/352; 523/451; 528/93
[58] Field of Search ............... 428/343, 352; 523/451; 264/213, 313; 249/112, 114 R, 115; 528/93

[56] References Cited

U.S. PATENT DOCUMENTS

| 2,843,557 | 7/1958 | Safford | 523/451 |
| 3,637,591 | 1/1972 | Coran | 523/451 |

FOREIGN PATENT DOCUMENTS

| 696352 | 10/1964 | Canada | 528/93 |
| 2064224 | 7/1971 | France | |
| 16438 | 1/1971 | Japan | 528/93 |
| 1316191 | 5/1973 | United Kingdom | |

OTHER PUBLICATIONS

*Handbook of Adhesives,* 2nd Edition, Irving Skeist, pp. 434–438.

*Primary Examiner*—George F. Lesmes
*Assistant Examiner*—E. Rollins Buffalow
*Attorney, Agent, or Firm*—Zarley, McKee, Thomte, Voorhees & Sease

[57] ABSTRACT

Proposed is a distance sheeting for construction of molds and models; the sheeting is produced by curing of 100 parts by weight of a mixture consisting of 45–60 parts by weight of an internally plasticized epoxy resin of low epoxide value, 5–10 parts by weight of an external plasticizer and 35–45 parts by weight of a globular-amorphous filler material with 9–13 parts by weight of polyamine curing agent. This distance sheeting is especially suitable as a substitute for the sheetings made of lead or wax which are being used currently for this purpose.

6 Claims, No Drawings

DISTANCE SHEETING FOR THE CONSTRUCTION OF MOLDS AND MODELS

BACKGROUND OF THE INVENTION

In the production of molds, for example the pressing out of car body parts, a model is first produced (positive form) which possesses the desired surface characteristics of the part to be pressed out; by means of a casting from this model, a negative mold is then made. With these molds the actual pressed out forms are then produced with the help of a machine tool which calipers the surface of the molds.

However, before the negative mold can be cast from the positive form, it is necessary to apply to the positive form a layer of material which in thickness corresponds to the thickness of the sheet metal which will be used later in the pressing process. It is customary to use self-sticking wax sheeting or lead sheeting for this purpose. Both materials have quite considerable disadvantages. For example, when wrapped around convexities on the surface of the model, they exhibit the tendency to stretch at these elevated spots, resulting in their thickness at these locations not corresponding to the thickness of the sheet metal to be used later in the pressing process. Moreover, these materials are also very susceptible to mechanical influences (fingernails, etc.) and thus are difficult to handle. Grinding and buffing of the surface of these materials is not possible. Smoothing of rough spots, edges and seams with a filler material is not feasible since putty or other filler will not adhere to lead and especially not to a wax surface. Such treatment is, however, important because the surface of the sheeting must be scrupulously smoothed before the casting procedure for the negative mold. In addition, the use of was has the disadvantage that complete removal of the sheeting is very difficult and the residues of wax left on the molds must be cleaned off.

It was the endeavor of the invention to develop a distance sheeting which does not exhibit the aforementioned disadvantages.

This intention has been achieved by a distance sheeting which is described in fuller detail in patent claim 1.

SUMMARY OF THE INVENTION

A distance sheeting means is disclosed herein for construction of molds and models comprising sheeting that has been made by curing 100 parts by weight of material consisting of 45 to 60 parts by weight of an internally plasticized epoxy resident of low epoxide value; 5-10 parts by weight of external plasticizer; and 35-45 parts by weight of globular-amorphous filler, with 9 to 13 parts by weight of a polyamine curing agent.

DESCRIPTION OF THE PREFERRED EMBODIMENT

This invention consists of a distance sheeting for the construction of molds and models. The distance sheeting of this invention possesses a series of remarkable properties which make it eminently suited for the purposes required. It possesses in particular a high degree of stability in form so that subsequent distortion is not possible. In respect to elasticity the sheeting is practically totally dead. That means that even in concave molds the sheeting remains exceptionally stable. It is not susceptible to mechanical influences so that in handling the material no problems develop even after application on the positive form. The surface can be easily sanded and buffed, which is of particular importance in working down ridges and seams. Ordinary filler materials adhere excellently to the sheeting so that producing a smooth surface offers no problems. Separation in producing the casting is excellent. In addition, no residues of material are left behind on the positive form after removal of the sheeting.

The epoxy resins called for by the invention possess a low epoxide value, that is a value which lies in the lower region of those epoxy resins customarily used commercially. Values of 0.25 and 0.35 have shown themselves to be very workable. The epoxy resins are internally plasticized in the usual manner. A useful product for this purpose is sold by Reichhold Chemie under the name "Beckopox" ® EP151.

As concerns the plasticizing agent, a common plasticizer is satisfactory, such as trioctylphosphate. The firm of Bayer AG sells a suitable product under the name "Disflamol" ® TOF.

The filler to be used should be globular-amorphous in nature. The designation "globular" is not to be taken in a strictly mathematical sense. What is meant is the absence of any edges or points on the filler particles. Also the expression "amorphous" should not be understood in a strictly scientific sense. A crystal structure can be tolerated as long as the filler behaves in a manner similar to an amorphous material. Chalk has proven to be very useful. It has been shown that the filler should exhibit the stated properties so that the sheeting will behave in a neutral way necessary to its intended purpose and also so that it can be easily worked on the surface.

The material is cured with a polyamine curing agent. Particularly good is the product "Beckopox" ® Special Hardener EH 610, made by Reichhold Chemie. According to the manufacturer, this curing agent is a modified polyamine.

Preferably the distance sheeting should be colored with an agent, for example 2-3% coloring material. This makes it easier to identify the finished models and molds.

The sheeting is best covered with a layer of non-curing adhesive in order to make easier the application to the mold or model. This adhesive layer can be protected by a removable paper covering.

The following example describes the production of a distance sheeting in accordance with the invention.

A pre-mix is made from the following constituents:

| | |
|---|---|
| Internally plasticized epoxy resin with low epoxide value, e.g. "Beckopox" EP 151 | 52.00 parts by weight |
| Trioctylphosphate, e.g. "Disflamol" TOF | 7.00 parts by weight |
| Finely ground chalk | 38.95 parts by weight |
| Coloring agent, e.g. red iron oxide | 2.05 parts by weight |
| | 100.00 parts by weight |

100 parts by weight of this mixture are mixed with 11.0 parts by weight of polyamine curing agent, e.g. "Beckopox" Special Hardener EH610. The mixture is then poured into an appropriate mold and cured thermally at 60° C. The resulting distance sheeting is covered on one side with an adhesive layer which is protected by a removable paper covering.

I claim:

1. Distance sheeting which is stable, not subject to mechanical influences, and has good adherence and separation properties with respect to positive mold forms for construction of molds and models characterized by the fact that it has been made by curing of 100 parts of weight of a material consisting of 45 to 60 parts by weight of an internally plasticized epoxy resin of low epoxide value within the range of from about 0.25 to about 0.35,
   5-10 parts by weight of external plasticizer, and
   35-45 parts by weight of a chalk globular-amorphous filler, and
   9 to 13 parts of weight of a polyamine curing agent.

2. Distance sheeting in accordance with claim 1, characterized by addition of 2-3% of a coloring agent.

3. Distance sheeting in accordance with claims 1 and 2 characterized by a layer of contact adhesive on one side.

4. In a method of making molds and models, the improvement comprising:
   selecting a positive mold form,
   applying as a plastic distance sheeting a layer of plastic distance sheeting material consisting essentially of from about 45 to about 60 parts by weight of an internally plasticized epoxy resin having an epoxide value within the range of from about 0.25 to about 0.35, from about 5 to about 10 parts by weight of an external plasticizer, from about 35 to about 45 parts by weight of a globular-amorphous filler, and from about 9 to about 13 parts by weight of a polyamine carrying agent.

5. The process of claim 4 wherein the globular amorphous filler is chalk.

6. The process of claim 4 wherein the distance sheeting also has as part of its composition from about 2% to about 3% of a coloring agent.

* * * * *